United States Patent
Leu et al.

(10) Patent No.: US 6,883,925 B2
(45) Date of Patent: Apr. 26, 2005

(54) LIGHT GUIDE PLATE AND BACKLIGHT SYSTEM USING THE SAME

(75) Inventors: Charles Leu, Fremont, CA (US); Tai-Cheng Yu, Tu-chen (TW); Ga-Lane Chen, Fremont, CA (US)

(73) Assignee: Hon Hai Precision Ind. Co., LTD, Taipei Hsien (TW)

( * ) Notice: Subject to any disclaimer, the term of this patent is extended or adjusted under 35 U.S.C. 154(b) by 0 days.

(21) Appl. No.: 10/654,249

(22) Filed: Sep. 2, 2003

(65) Prior Publication Data

US 2004/0105250 A1 Jun. 3, 2004

(30) Foreign Application Priority Data

Nov. 29, 2002 (TW) ........................................ 91134734 A

(51) Int. Cl.[7] ................................................. F21V 8/00
(52) U.S. Cl. ........................................... 362/31; 362/26
(58) Field of Search ............................ 362/26, 31, 330, 362/339, 561; 349/65

(56) References Cited

U.S. PATENT DOCUMENTS

| | | | | |
|---|---|---|---|---|
| 3,043,947 A | * | 7/1962 | Albinger, Jr. ................. | 362/31 |
| 5,775,791 A | * | 7/1998 | Yoshikawa et al. ........... | 362/31 |
| 6,443,583 B1 | | 9/2002 | Ha | |
| 6,508,564 B1 | * | 1/2003 | Kuwabara et al. ............. | 362/31 |
| 6,601,984 B1 | * | 8/2003 | Yamamoto et al. .......... | 362/555 |

* cited by examiner

*Primary Examiner*—Y. My Quach-Lee
(74) *Attorney, Agent, or Firm*—Wei Te Chung

(57) ABSTRACT

A backlight system (10) in accordance with the present invention includes a light guide plate (20) and two light sources (30) disposed adjacent opposite sides of the light guide plate. The light guide plate includes two incident surfaces (21), a light exit surface (22) and a bottom surface (24) opposite to the light exit surface. The bottom surface has a plurality of diffusion units (23) therein, and a reflective film (241) thereon. Diffusion surfaces (25) of the plurality of the diffusion units cooperate with each other to form a curved face for directing light beams to be output from the light exit surface in a predetermined angular range.

16 Claims, 6 Drawing Sheets

LIGHT GUIDE PLATE AND BACKLIGHT SYSTEM USING THE SAME

BACKGROUND OF THE INVENTION

1. Field of the Invention

The present invention relates to a backlight device and particularly to an edge light type backlight device for use in a liquid crystal display (LCD) or the like.

2. Description of Related Art

A liquid crystal display device is widely used in note book computers or portable TVs and generally comprises a liquid crystal panel and a backlight system to provide uniform collimated light to the liquid crystal panel. The backlight system mainly comprises a light source and a light guide plate. The light guide plate is made of a transparent acrylic resin and is used for guiding the light beams emitted by the light source to uniformly illuminate the liquid crystal panel.

Referring to FIG. 11, U.S. Pat. No. 6,443,583 discloses a backlight system 1. The backlight system 1 includes a light source 110, a light source cover 120 and a light guide plate 200. The light guide plate 200 comprises a light input surface 201, a light output surface 203 adjoining the light input surface 201 and a bottom surface 202 opposite to the light output surface 203. The backlight system 1 further comprises a reflective sheet 210 opposite to the bottom surface 202, a diffusion sheet 220 opposite to the light output surface 203, a prism sheet 230 disposed above the diffusion sheet 220 and a protecting film 240 disposed above the prism sheet 230.

In operation, the light source 110 emits light beams and the light beams are transmitted into the light guide plate 200. The reflective sheet 210 reflects the light beams and directs the light beams to exit from the light output surface 203. The light beams then sequentially pass through the diffusion sheet 220, the prism sheet 230 and the protecting film 240 to illuminate a liquid crystal panel.

However, the conventional backlight system 1 has some disadvantages. First, the backlight system 1 comprises a plurality of optical elements, such as the reflective sheet 210, the diffusion sheet 220, the prism sheet 230 and the protecting film 240, which makes it high in manufacturing cost and complicated in structure. Second, a large amount of the light beams generated by the light source 110 is usually lost after passing through the optical elements of the backlight system 1.

Therefore, an improved backlight system which overcomes the above-described disadvantages of the conventional backlight system is desired.

SUMMARY OF THE INVENTION

An object of the present invention is to provide a backlight system which has a low manufacturing cost and a simple structure.

Another object of the present invention is to provide a backlight system which is highly effective in utilization of light beams.

In order to achieve the above-described objects, a backlight system in accordance with the present invention comprises a light guide plate and at least a light source. The light guide plate includes at least an incident surface on a respective side of the light guide plate, a light exit surface, a bottom surface opposite to the light exit surface, the bottom surface having a plurality of diffusion units therein and a reflective film thereon. Each diffusion unit has a diffusion surface, all the diffusion surfaces cooperating with each other to form a curved face for directing light beams to be output through the light exit surface in a predetermined angular range. The at least a light source is disposed adjacent the at least an incident surface of the light guide plate for emitting light beams.

Other objects, advantages, and novel features of the present invention will become more apparent from the following detailed description when taken in conjunction with the accompanying drawings, wherein:

DETAILED DESCRIPTION OF THE PRESENT INVENTION

Reference now will be made to the drawings to describe the present invention in detail.

Figure 1:
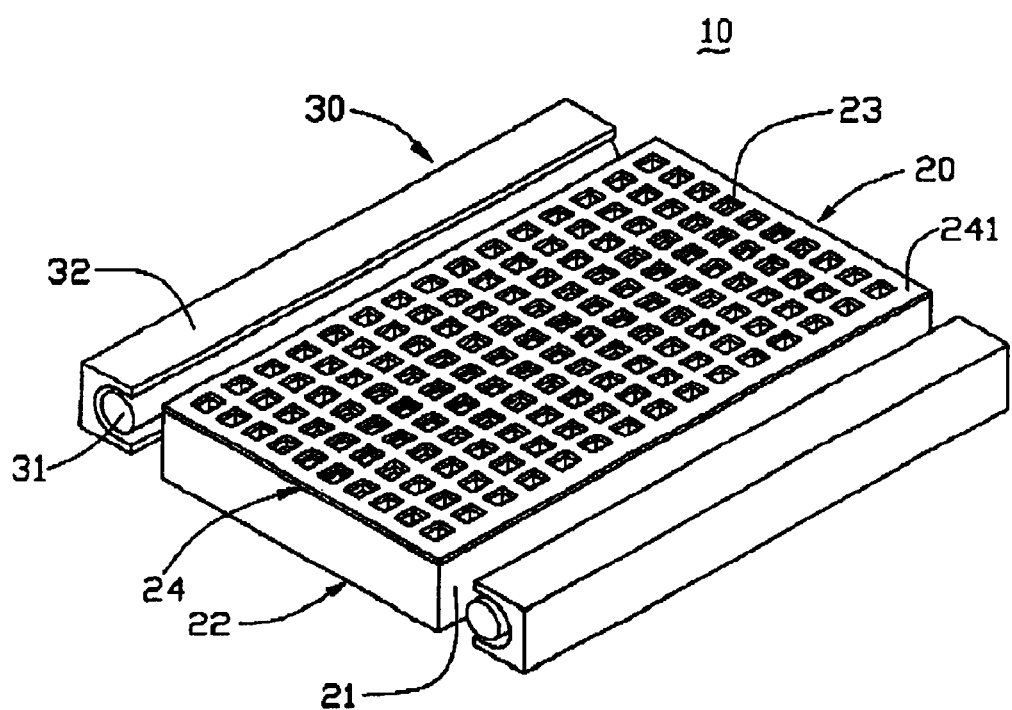
FIG. 1 is a perspective view of a backlight system of a preferred first embodiment in accordance with the present invention, viewed from a bottom aspect.
Figure 2:
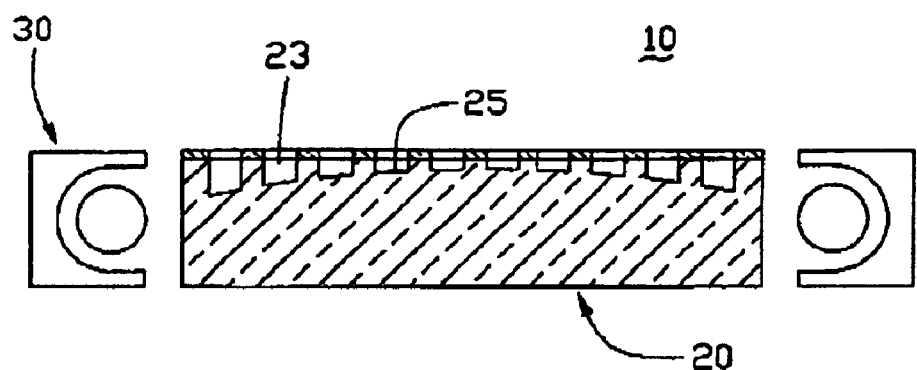
FIG. 2 is a cross-sectional view of the backlight system in FIG. 1.

Referring to FIGS. 1 and 2, a backlight system 10 of a first preferred embodiment in accordance with the present invention comprises a light guide plate 20 and two linear light sources 30 disposed adjacent opposite sides of the light guide plate 20. Each linear light source 30 comprises a lamp 31 and a lamp cover 32.

The light guide plate 20 has a rectangular shape, and comprises two opposite light incident surfaces 21, a light exit surface 22 adjoining the light incident surfaces 21, and a bottom surface 24 opposite to the light exit surface 22. The light guide plate 20 can be made of transparent acrylic resin. The light guide plate 20 defines a plurality of diffusion units therein through the bottom surface 24. Each diffusion unit comprises a recess 23 having a diffusion surface 25. The recesses 23 are arranged in a uniform pattern. Shapes of the recesses 23 can be cylindrical, hemispherical, rectangular or cuboidal. The diffusion surfaces 25 cooperate with each other to form a curved face for directing light beams to be output from the light exit surface 22 in a predetermined angular range. The shape of the curved face is cylindrical.

The bottom surface 24 has a reflective film 241 thereon. The diffusion surfaces 25 also have a reflective film (not shown) thereon, which prevents light beams from exiting therefrom. The reflective film 241 and the reflective film of the diffusion surfaces comprise a plurality of layers of materials having a high reflectivity, such silicon dioxide ($SiO_2$) or titanium dioxide ($TiO_2$). The reflective films have a reflectivity of greater than 98% for wavelengths in the visible range of the spectrum.

In assembly, the linear light sources 30 are positioned adjacent to the light incident surfaces 21 of the light guide plate 20. In operation, light beams from the two lamps 31 enter into the light incident surfaces 21 of the light guide plate 20, and exit from the light exit surface 22.

Figure 3:
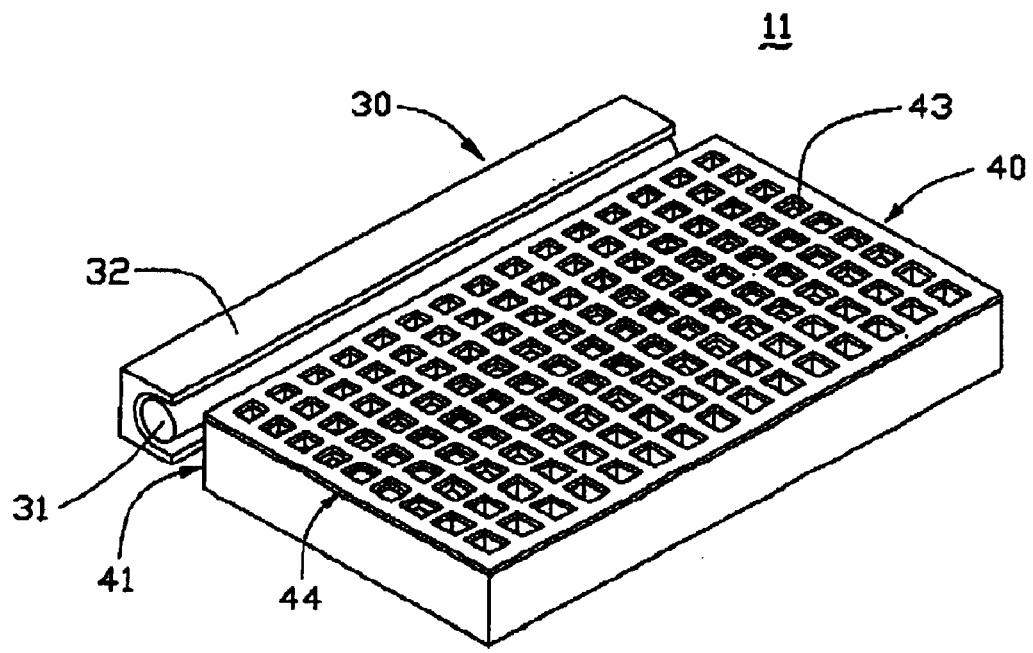
FIG. 3 is a perspective view of a backlight system of a second embodiment of the present invention, viewed from a bottom aspect.
Figure 4:
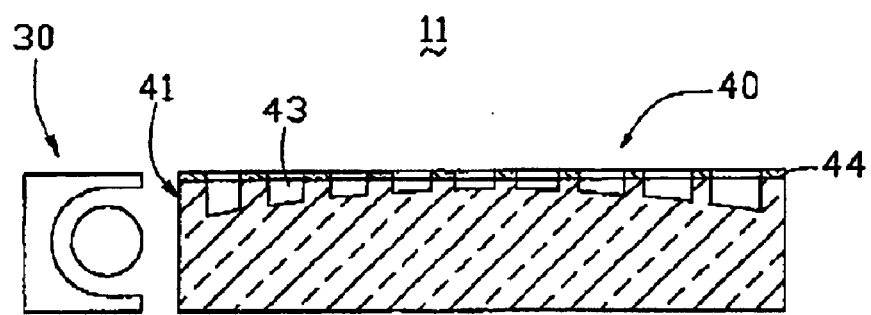
FIG. 4 is a cross-sectional view of the backlight system in FIG. 3.

Referring to FIGS. 3–4, a backlight system 11 of a second embodiment in accordance with the present invention is similar to the backlight system 10 of the first embodiment. However, the backlight system 11 comprises only one light source 30 positioned adjacent a light guide plate 40; and the light guide plate 40 comprises a bottom surface 44, which has a plurality of recesses 43 therethrough. A density and size of the recesses 43 increases along a direction away from the light incident surface 41.

Figure 5:
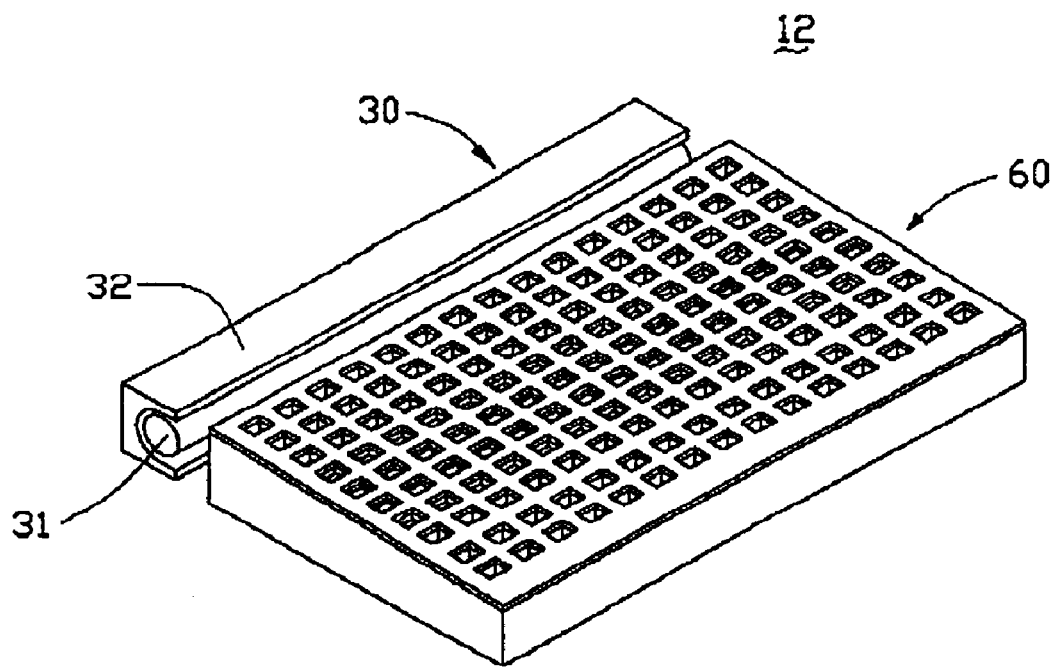
FIG. 5 is a perspective view of a third backlight system of the present invention, viewed from a bottom aspect.
Figure 6:
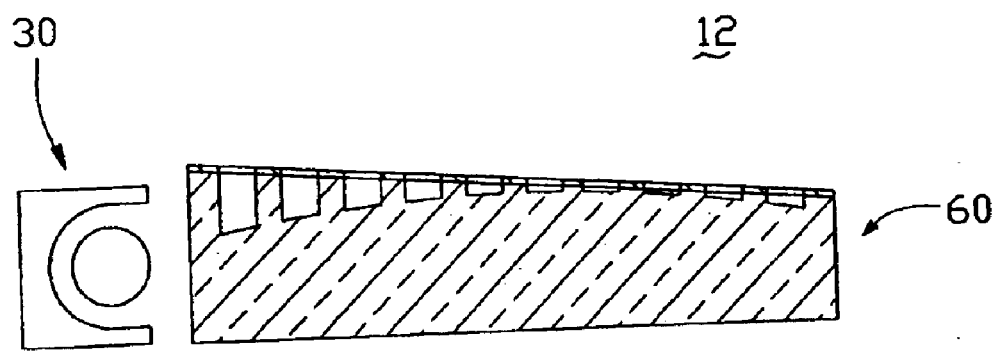
FIG. 6 is a cross-sectional view of the backlight system in FIG. 5.

Referring to FIGS. 5–6, a backlight system 12 of a third embodiment in accordance with the present invention is similar to the backlight system 10 of the first embodiment. However, the backlight system 12 comprises only one light source 30 positioned adjacent to a light guide plate 60, and the light guide plate 60 has a wedge shape.

Figure 7:
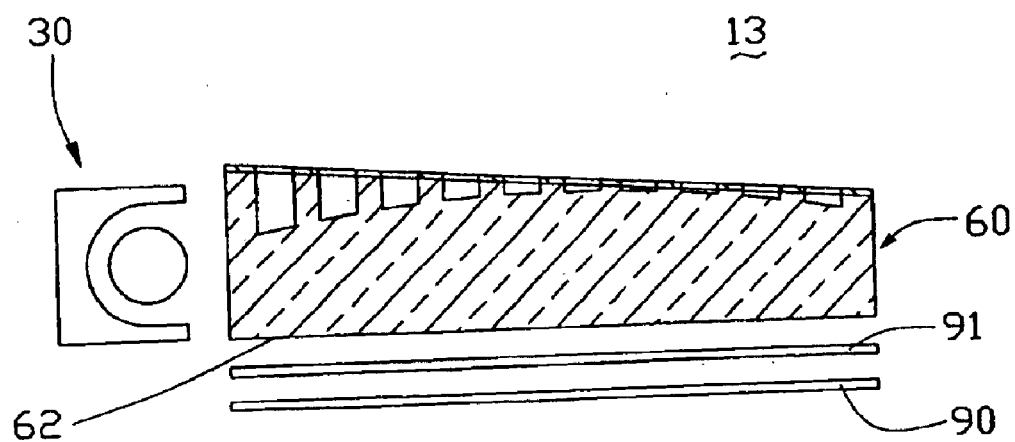
FIG. 7 is a cross-sectional view of a fourth backlight system of the present invention.

Referring to FIG. 7, a backlight system 13 of a fourth embodiment of the present invention is similar to the backlight system 12 of the third embodiment. However, the backlight system 13 further comprises a diffusion sheet 91 and a prism sheet 90, which are positioned adjacent to the light exit surface 62 of the light guide plate 60 in that order. The diffusion sheet 91 and the prism sheet 90 are provided for enhancing the uniformity and brightness of the light beams emitting from the light exit surface 62 of the light guide plate 60.

Figure 8:
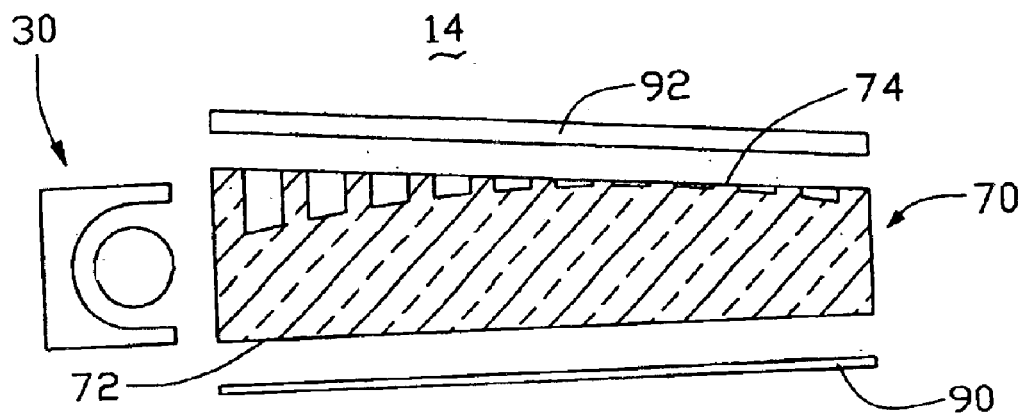
FIG. 8 is a cross-sectional view of a fifth backlight system of the present invention.

Referring to FIG. 8, a backlight system 14 of a fifth embodiment of the present invention is similar to the backlight system 12 of the third embodiment. However, the reflective film of a light guide plate 70 is omitted, and the backlight system 14 further comprises a reflective sheet 92 positioned adjacent to the bottom surface 74 of the light guide plate 70, and a prism sheet 90 positioned adjacent to the light exit surface 72 thereof. The reflective sheet 92 prevents light beams from emitting from the bottom surface 74, and the prism sheet 90 can enhance the brightness of the light beams emitting from the light guide plate 70.

Figure 9:
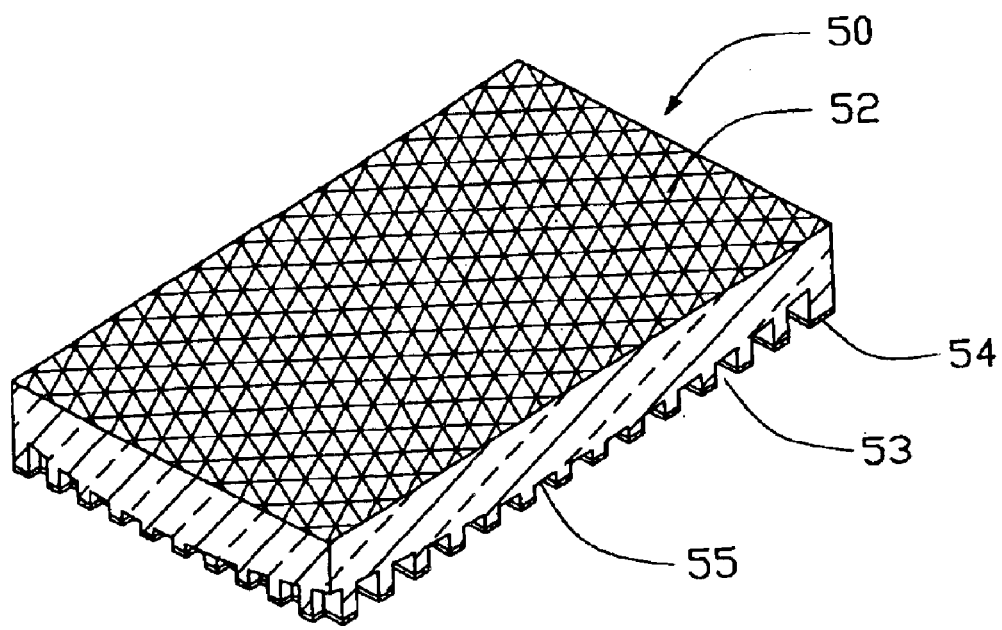
FIG. 9 is a perspective view of an alternative light guide plate for the present invention, viewed from a top aspect.

Referring to FIG. 9, an alternative light guide plate 50 of the present invention is similar to the light guide plate 20 (shown in FIG. 1). However, the light guide plate 50 comprises a bottom surface 54, and a rough surface 52 with controllable roughness opposite to the bottom surface 54. The bottom surface 54 has a plurality of recesses 53, each having a diffusion surface 55 at an upper end thereof. The diffusion surfaces 55 cooperate with each other to form a curved face for directing light beams to be output from the rough surface 52 in a predetermined angular range. The shape of the curved face is arc-shaped.

Figure 10:
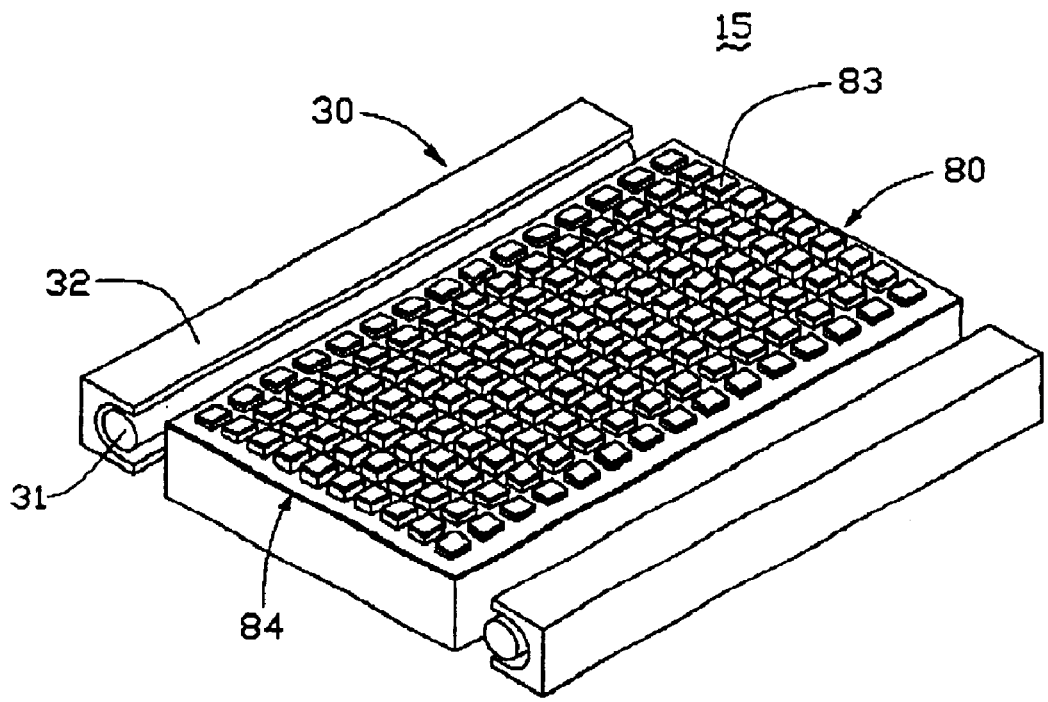
FIG. 10 is a perspective view of a sixth backlight system of the present invention, viewed from a bottom aspect.
Figure 11:
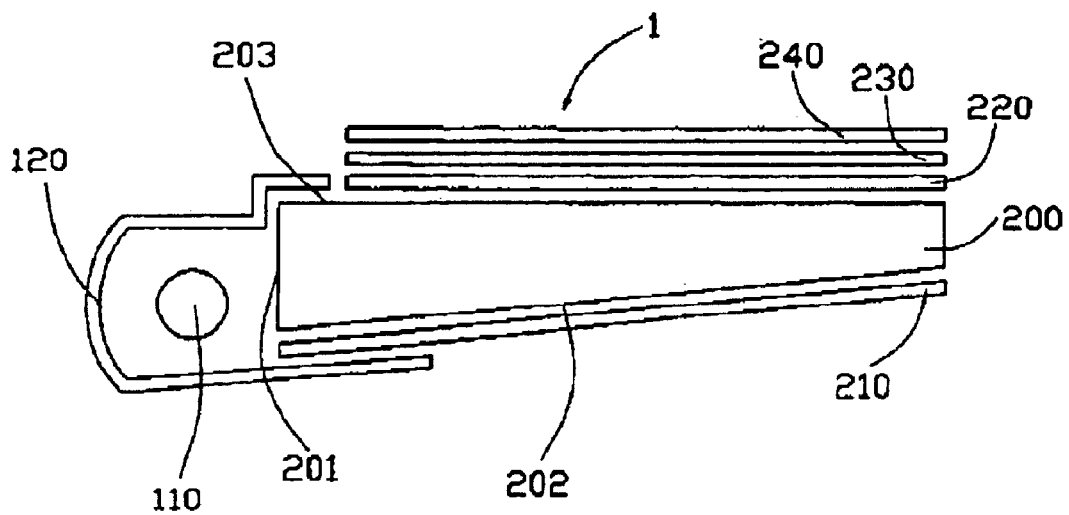
FIG. 11 is a prior art backlight system.

FIG. 10 shows a backlight system 15 of a sixth embodiment of the present invention. Most structures of the backlight system 15 are similar to those of the backlight system 10. However, the backlight system 15 comprises a light guide plate 80 having a bottom surface 84. The difference between the light guide plate 20 and the light guide plate 80 is that the bottom surface 84 has a plurality of protrusions 83, each protrusion having a diffusion surface (not labeled) formed thereon. The plurality of protrusions 83 is spaced uniformly, and a shape of each can be cylindrical, hemispherical, rectangular or cuboid. The diffusion surfaces cooperate with each other to form a curved face for directing light beams to be output from the light exit surface (not labeled) in a predetermined angular range. The shape of the curved face is cylindrical. The bottom surface 84 and the diffusion surface have a reflective film (not labeled) thereon, which prevents light beams from emitting thereout.

Advantages of the described embodiments over the prior art include the following. First, the number of optical elements is reduced, resulting in a system which has a lower cost and simpler structure. Second, the curved face formed by the diffusion units assures that the backlight system is highly effective in its utilization of light beams.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A backlight system comprising:
   a light guide plate including:
   at least one incident surface;
   a light exit surface; and
   a bottom surface opposite to the light exit surface, the bottom surface having a plurality of diffusion units thereat, and a reflective film thereon, each diffusion unit having a diffusion surface, all the diffusion surfaces cooperating with each other to form a curved face for directing light beams to be output through the light exit surface in a predetermined angular range; and
   at least one light source disposed adjacent the at least one incident surface of the light guide plate for emitting light beams.

2. The backlight system as claimed in claim 1, wherein each of the diffusion units comprises a recess.

3. The backlight system as claimed in claim 1, wherein each of the diffusion units is a protrusion.

4. The backlight system as claimed in claim 1, wherein each diffusion surface has a reflective film thereon.

5. The backlight system as claimed in claim 1, wherein the diffusion units are spaced uniformly apart.

6. The backlight system as claimed in claim 1, wherein a density and size of the diffusion units increases along a direction away from the light incident surface.

7. The backlight system as claimed in claim 1, wherein the curved face is cylindrical or arc-shaped.

8. The backlight system as claimed in claim 1, wherein the reflective film has a reflective ratio greater than 98% for wavelengths in the range of the visible spectrum.

9. The backlight system as claimed in claim 1, wherein the light guide plate is wedge-shaped.

10. A light guide plate including:
   at least one incident surface;
   a light exit surface; and
   a bottom surface opposite to the light exit surface, the bottom surface having a plurality of diffusion units thereat, and a reflective film thereon, each of said diffusion units having a diffusion surface, all the diffusion surfaces cooperating with one another to form a curved face for directing light beams to be output through the light exit surface in a predetermined angular range.

11. The light guide plate as claimed in claim 10, wherein each of the diffusion units comprises a recess.

12. The light guide plate as claimed in claim 10, wherein each of the diffusion units is a protrusion.

13. The light guide plate as claimed in claim 10, wherein the diffusion units are spaced uniformly apart.

14. The light guide plate as claimed in claim 10, wherein a density and size of the diffusion units increases along a direction away from the light incident surface.

15. The light guide plate as claimed in claim 10, wherein the curved face is cylindrical or arc-shaped.

16. A light guide plate for use in a backlight system, comprising:
   at least one light incident surface;
   a light exit surface; and
   a bottom surface opposite to the light exit surface, a plurality of matrix-like convex surfaces provided around the bottom surface and commonly defining a large curved face oriented toward the light exit surface for directing light beams to be output through the light exit surface in a predetermined angular range.

* * * * *